Aug. 10, 1943.          S. B. NEILEY ET AL          2,326,160
MANUFACTURE OF ARTICLES FROM AQUEOUS RUBBER DISPERSIONS
Filed Aug. 15, 1939
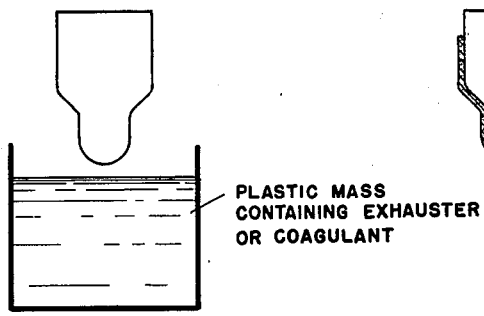
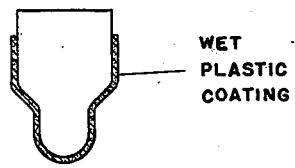
FIG. 1          FIG. 2
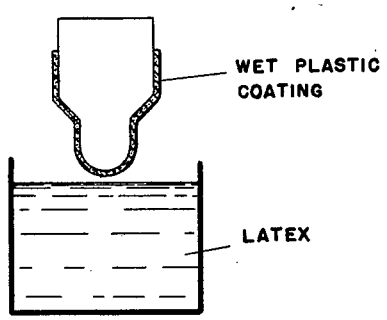
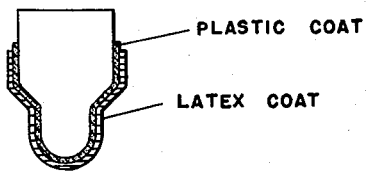
FIG. 3          FIG. 4
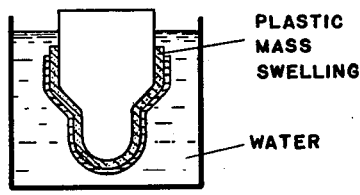
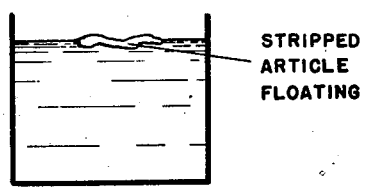
FIG. 5          FIG. 6
STEPHEN B. NEILEY
EMILE E. HABIB
INVENTORS
BY: Theodore C. Browne
ATTORNEY Patented Aug. 10, 1943

2,326,160

UNITED STATES PATENT OFFICE 2,326,160

MANUFACTURE OF ARTICLES FROM AQUEOUS RUBBER DISPERSIONS

Stephen B. Neiley, Winchester, and Emile E. Habib, Arlington, Mass., assignors to Dewey and Almy Chemical Company, North Cambridge, Mass., a corporation of Massachusetts Application August 15, 1939, Serial No. 290,252

4 Claims. (Cl. 18—58)

This invention is concerned with the manufacture of formed shapes from aqueous dispersions of rubber, and is directed towards the solution of certain problems which arise in the rubber dipping art when exhausters, Patent No. 2,172,400, issued to Stephen B. Neiley, September 12, 1939, or coagulants are spread over formers and these are subsequently dipped in the dispersion.

It is an object of the present invention to cause the rapid coagulation of the latex in molding or dipping procedures; to form against the surface of the former one or a number of coagulated layers of latex which may later be dried and vulcanized; to form layers of material thickness; to avoid sags, drips and irregularities in gauge; and to provide a simple and expeditious method by which articles having a regular configuration may be stripped from the formers. These and other objects will become apparent from the specification.

In the prior practice, it was characteristic of both coats of coagulating agents and coats of exhauster that the materials, being liquids, responded immediately to gravitational force and drained down the surface of the mold. Inevitably, therefore, upper areas of the mold were covered with less weight of coagulant or exhauster per unit area than were lower areas and, since both coagulants and exhausters work quantitatively, both processes possess the disadvantage that it is extremely difficult to maintain a uniform gauge of the rubber which is deposited upon the form.

In contradistinction to the coagulant or exhausting materials previously used, we employ a plastic system. Plasticity as distinguished from viscosity implies that, upon the application of force, a plastic system will not move. Movement starts only when the force upon the plastic system exceeds what is known as its "yield value." As applied to our process, a plastic film will not respond to gravity since the absolute value of its adhesion to the mold and the yield value of the film itself may be made to exceed gravitational pull. It is possible, therefore, to distribute over the surface of the mold a completely uniform film of an active substance which will neither slide nor drip and will produce a uniformly gauged rubber deposit.

Although a number of materials which will impart plasticity to a fluid system are well known, and it is within the scope of the invention to utilize any hydrophilic colloid which is compatible with the exhausters or coagulants and which imparts plasticity, we prefer to use bentonite because of its ready availability, low cost, and because it possesses to an outstanding degree the characteristics that we seek. Dried bentonite swells with great rapidity in water and to a lesser extent in other polar liquids, and in the swollen state is slippery, almost soapy in its action. We utilize these properties possessed by bentonite and analogous substances to provide means for stripping any regularly shaped article from a mold in a completely automatic manner.

In the drawing, Figure 1 is a schematic elevation showing the dipping of the form into the plastic exhauster or coagulant;

Figure 2 is a vertical cross-section through the form having a coating of the plastic coagulant or exhauster;

Figure 3 illustrates the dipping of the form of Figure 2 into a latex dispersion;

Figure 4 is a vertical section of the form after the operation of Figure 3;

Figure 5 illustrates the swelling of the plastic mass preparatory to stripping; and Figure 6 illustrates the stripped rubber article.

Dipping bath

In carrying out this invention we preferably include in the aqueous dispersion of the rubber a potential coagulant for the dispersion. The potential coagulant is a "double" or complex salt formed by the reaction of water-soluble amine compounds upon salts of multi-valent metals. Many such complex salts are known. For reasons of ready availability and low cost, we prefer to use the salt disclosed in Reissue Patent No. 19,426 to S. B. Neiley, dated January 15, 1935. Specifically, in carrying out the invention, 10 parts of granulated zinc chloride are dissolved in 160 parts of water and to this solution is added 15 parts of 28° Baumé commercial aqueous ammonia. This solution is added to commercial concentrated latex containing 60–65% rubber solids which may be compounded, if desired, with sulphur, activator, and accelerator in appropriate amounts.

Characteristic proportions for a workable mixture are: aqueous dispersion of rubber 1,000 parts, potential coagulant solution 11 to 33 parts.

Exhauster

To 45 parts of a suspension of bentonite in water containing 14% of dried bentonite is added 53 parts of 40% solution of formaldehyde and 2 parts of glycerine.

Procedure

The mold is dipped in the exhauster solution and allowed to dry superficially. The coated form is then dipped in the dispersion described above with the result that the formaldehyde reacts with the excess ammonia present in the dispersion and rapidly builds up a coagulated latex film due to the fact that the double salt present in the dispersion breaks down releasing coagulative zinc ions wherever the formaldehyde penetrates.

Although the exhauster material just described is almost as fluid as water, and is in no sense dry when the former is dipped in the dispersion, the presence of the bentonite is sufficient to modify materially the characteristics of the solution. Instead of a viscous system which would exist if no bentonite had been added and which according to the laws of viscous systems, would thin down upon the upper portions of the former and collect as a drip at the lower portion, we now have a plastic system which will not move until its yield value has been exceeded. As a result no sagging or slipping occurs on the former. Thus we carry and retain a uniform weight of exhauster per unit area of former and, since the exhauster reacts quantitatively with the excess amine present in the dispersion, causes the formation of a uniform, solidified coating of rubber upon the former. A rubber article of uniform gauge throughout is the result.

The stripping of dipped goods from the form has always presented a problem to the manufacturer. It is a step which has always included rolling, stretching or pulling and, although brushing down the article or blowing it off the form are used for specific articles, manual stripping is still generally practiced today. The strains which the stripping operation imposes are so severe that if the film is not first so thoroughly dried while it is in contact with the form that distortion is negligible, and preferably even vulcanized as well, finger marks and rolled edges will appear in the finished article.

We have found that if the plasticity imparting material present in the exhauster is a highly hydrophilic substance, typified by bentonite, it will swell if the former with its associated rubber coat is dipped in water. The swelling breaks the adhesion of the rubber to the former and if the former is swished up and down in the water bath a few inches below the surface in such a manner that water is forced in between the former and the rubber, a quick upward jerk will strip the rubber coating completely and leave it floating in the water bath. Water, as a chemical substance, is not essential in the stripping operation The colloids swell sufficiently in polar liquids to make stripping possible. Hence, it is within the scope of this invention to swell the colloid and strip the rubber in any operative polar liquid such as water, alcohol, etc.

In some cases, particularly with dipped articles of large size, dipping of the former into the rubber dispersion results in sufficient swelling and softening of the hydrophilic colloid to permit easy stripping of the rubber article from the former. In these cases dipping of the former with its associated rubber coating into a bath of water to facilitate stripping may be dispensed with.

In manufacturing practice, a rack full of rubber coated formers is hung from an air lift and the formers lowered into water. The lift is then operated to oscillate vertically through a path about ⅜" long, then the lifting valve is opened, jerking the formers clear of the water. The stripping is complete and practically instantaneous.

The process is illustrated in the accompanying drawing. Figure 1 illustrates the dipping of the form in a bath of plastic material containing a coagulant or exhauster. When the form is withdrawn from the bath of plastic material containing coagulant or exhauster, it is covered with a wet plastic coating, as illustrated in Figure 2. The form is then dipped into the latex dispersion as shown in Figure 3 to bring about a deposit of rubber on the plastic coating, as shown in Figure 4. When the rubber article is to be stripped the form is immersed in a bath of water or other polar liquid, as shown in Figure 5, whereupon the plastic layer swells and softens. If the form is now swished up and down in the water the article will be pulled off the form and left floating in the water, as shown in Figure 6.

We find it not strictly necessary, but advantageous to dry the exhauster slightly before the exhauster coated forms are lowered into the dipping bath; drying increases the stability of the exhauster film to such an extent that the weight of coagulated latex which the film supports is insufficient to make it slip on the former, and in addition the lateral movement due to swelling which loosens the rubber coating is greater and more positive. The exhauster coat should not be done dry, however, for uneven, or ridged articles may result. It is to prevent drying to too great a degree that we include a hydroscopic material in the exhauster, namely glycerine.

If it is preferred to use coagulants on the mold rather than exhausters, the coagulant solution may be made as follows:

| | Parts |
|---|---|
| Bentonite 14% suspension in water | 50 |
| Aluminum sulphate $Al_2(SO_4)_3 \cdot 18H_2O$ | 7 |
| Water | 23 |
| Acetone | 10 to 20 |

Di- and tri-valent metallic salts and other recognized coagulant bodies may be substituted for the aluminum sulphate if desired.

We consider it advantageous to use as an ingredient in the coagulant solution a material which will function in an analogous manner to the formaldehyde upon the bentonite in the exhauster example given above. In the exhauster composition the formaldehyde exerts a distinct stiffening action upon the bentonite and prevents it from becoming so slimy that the rubber deposit will fall off the former or slide or fold during the dipping procedure. We may achieve the same result, when using coagulants, by adding to the composition about 10% to 20% of a substance such as acetone or alcohol which by its evaporation sufficiently dehydrates the bentonite to insure that no slimy deposits of bentonite will enter the dip tank. As in the case when exhausters are used, the coagulant composition including bentonite should not be bone dry when the formers are dipped in the dispersion. The presence of a small amount of glycerine in the composition assures the presence of sufficient retained moisture so that the bentonite, when in the wash water and stripping bath, may be peptized and swollen to the necessary extent to permit stripping. With these precautions taken, the stripping of a regularly shaped article from a former is as easy when using coagulants as when using the exhauster method which we prefer.

The term "rubber" as used throughout the specification and claims denotes not only the solids of *Hevea braziliensis*, but natural or artificial substances possessing similar essential characteristics, and the term "rubber latex" denotes not only the natural or preserved latex of *Hevea braziliensis*, but dispersions of natural or artificial substances which may be coagulated in essentially a similar manner.

We claim:

1. The method of depositing rubber of uniform thickness upon formers and of stripping the rubber deposit therefrom which comprises forming a plastic mixture of water, an active substance selected from the class of exhausters and rubber latex coagulants, and a hydrophilic colloid, coating the former with the mixture and immersing the coated former in an aqueous dispersion of rubber, swelling the colloid to loosen the rubber deposit and manipulating the former to shake the deposit therefrom.

2. The method of stripping rubber articles from formers which includes coating a former with a water suspension of a hydrophilic colloid, forming a coherent coat of rubber upon the colloidal coating by depositing rubber derived from an aqueous dispersion thereon, immersing the former with its adherent coat of rubber thereon in a polar liquid for a time sufficient to swell the colloid and loosen the rubber and manipulating the former to shake the rubber deposit therefrom.

3. The method of forming articles of uniform thickness from rubber dispersions which comprises coating a former with a plastic aqueous mixture of a hydrophilic plasticity imparting colloid and a substance selected from the class of exhausters and latex coagulants, said mixture having a yield value such that the coating applied does not flow under its own weight, immersing the former with its coating in a plastic condition in a dispersion of rubber to cause a deposit of rubber to form against the plastic coating and stripping the rubber from the former.

4. The method of forming articles of uniform thickness from rubber dispersions which comprises coating a former with a plastic aqueous mixture of a hydrophilic plasticity imparting colloid and a substance selected from the class of exhausters and latex coagulants, said mixture having a yield value such that the coating applied does not flow under its own weight, stiffening the plastic coating sufficiently to support the weight of the rubber coat to be deposited, immersing the former with its coating in a plastic condition in a dispersion of rubber to cause a deposit of rubber to form against the plastic coating and stripping the rubber from the former.

STEPHEN B. NEILEY.
EMILE E. HABIB.